(12) United States Patent
Venetianer et al.

(10) Patent No.: US 12,254,659 B2
(45) Date of Patent: Mar. 18, 2025

(54) HYBRID VIDEO ANALYTICS FOR SMALL AND SPECIALIZED OBJECT DETECTION

(71) Applicant: MOTOROLA SOLUTIONS, INC., Chicago, IL (US)

(72) Inventors: Peter L. Venetianer, McLean, VA (US); Burak Kakillioglu, Syracuse, NY (US); Aleksey Lipchin, Newton, MA (US); Xiao Xiao, Winchester, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 433 days.

(21) Appl. No.: 17/662,050

(22) Filed: May 4, 2022

(65) Prior Publication Data
US 2023/0360355 A1    Nov. 9, 2023

(51) Int. Cl.
*G06V 10/20* (2022.01)
*G06T 7/194* (2017.01)
*G06V 10/82* (2022.01)
*G06V 20/52* (2022.01)

(52) U.S. Cl.
CPC ............ *G06V 10/255* (2022.01); *G06T 7/194* (2017.01); *G06V 10/82* (2022.01); *G06V 20/52* (2022.01)

(58) Field of Classification Search
CPC ...... G06V 10/255; G06V 10/82; G06V 20/52; G06V 10/764; G06T 7/194
See application file for complete search history.

(56) References Cited

U.S. PATENT DOCUMENTS

| | | | | |
|---|---|---|---|---|
| 10,817,739 | B2* | 10/2020 | Gupta | G06F 3/04845 |
| 10,878,578 | B2* | 12/2020 | Cheng | G06V 20/52 |
| 11,461,919 | B2* | 10/2022 | Wolf | G06V 30/2504 |
| 2019/0130580 | A1* | 5/2019 | Chen | G06V 10/82 |
| 2019/0130586 | A1* | 5/2019 | Zhou | G06T 7/246 |

(Continued)

FOREIGN PATENT DOCUMENTS

WO    2019/083738 A1    5/2019

OTHER PUBLICATIONS

Zhou et al., "Moving Object Detection by Detecting Contiguous Outliers in the Low-Rank Representation," IEEE Transactions on Pattern Analysis and Machine Intelligence, 2013, 35(3): 597-610.

(Continued)

*Primary Examiner* — Tom Y Lu
(74) *Attorney, Agent, or Firm* — Michael Best & Friedrich LLP (57) ABSTRACT

One aspect provides a method for object detection including detecting, using an electronic processor, a plurality of candidate objects in a video using a convolutional neural network detection process and a background subtraction detection process and identifying, using the electronic processor, a candidate object from the plurality of candidate objects. The candidate object detected by the background subtraction detection process in a location of the video with no candidate objects detected by the convolutional neural network detection process. The method also includes determining, using the electronic processor, a background subtraction confidence level of the candidate object and categorizing, using the electronic processor, the candidate object as a detected object in the video in response to the background subtraction confidence level satisfying a background subtraction confidence threshold.

20 Claims, 7 Drawing Sheets

(56) References Cited

U.S. PATENT DOCUMENTS

| | | | |
|---|---|---|---|
| 2020/0364466 A1 | 11/2020 | Latapie et al. | |
| 2021/0374941 A1 | 12/2021 | Liu et al. | |
| 2023/0360355 A1* | 11/2023 | Venetianer | G06V 20/52 |

OTHER PUBLICATIONS

Zivkovic, "Improved Adaptive Gaussian Mixture Model for Background Subtraction," Proceedings of the 17th International Conference on Pattern Recognition, 2004, 4 pages.

Xin et al., "Background Subtraction via Generalized Fused Lasso Foreground Modeling," IEEE Conference on Computer Vision and Pattern Recognition, 2015, 4676-4684.

Stauffer et al., "Adaptive Background Mixture Models for Real-time Tracking," 1999 IEEE Computer Society Conference on Computer Vision and Pattern Recognition, 1999, 246-252.

Zivkovic et al., "Efficient Adaptive Density Estimation per Image Pixel for the Task of Background Subtraction," Pattern Recognition Letters, 2006, 27(7): 773-780.

Lu et al., "Hybrid Deep Learning Based Moving Object Detection via Motion Prediction," 2018 Chinese Automation Congress, 2018, 1862-1867.

Camplani et al., "Multi-sensor Background Subtraction by Fusing Multiple Region-based Probabilistic Classifiers," Pattern Recognition Letters, 2014, 11 pages.

Grosgeorge et al., "Concurrent Segmentation and Object Detection CNNS for Aircraft Detection and Identification in Satellite Images," IGARSS 2020-2020 IEEE International Geoscience and Remote Sensing Symposium, 2020, 4 pages.

Ferariu et al., "Fusing Faster R-CNN and Background Subtraction Based on the Mixture of Gaussians Model," 24th International Conference on System Theory, Control and Computing, 2020, 367-372.

International Search Report and Written Opinion for Application No. PCT/US2023/017759 dated Jun. 16, 2023 (12 pages).

\* cited by examiner

HYBRID VIDEO ANALYTICS FOR SMALL AND SPECIALIZED OBJECT DETECTION

BACKGROUND OF THE INVENTION

Broadly speaking, object detection is a type of image processing. A number of object detection techniques are known.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments, examples, and aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, aspects, and features.

The apparatus and method components have been represented where appropriate by conventional symbols in the drawings, showing only those specific details that are pertinent to understanding various embodiments, examples, aspects, and features so as not to obscure the disclosure with details that will be readily apparent to those of ordinary skill in the art having the benefit of the description herein.

DETAILED DESCRIPTION OF THE INVENTION

Deep learning may be used for object detection and provides several advantages when applied to video surveillance. Sufficient training data is available to train deep learning modules, for example, convolutional neural networks to reliably detect objects in videos from surveillance cameras. In public safety implementations, convolutional neural networks can be trained and used to detect vehicles, persons, and/or animals in surveillance videos. Trained convolutional neural networks often work well to detect objects (for example, vehicles and/or persons) when the video captures large objects. However, convolutional neural networks perform poorly when detecting small or distant objects. Performance of convolutional neural networks is further degraded when videos are captured at night or in dimly lit areas. Sensitivity of the convolutional neural network can be increased by lowering the detection confidence threshold. However, lowering the detection confidence threshold may lead to an unacceptable number of false positives. An additional limitation of convolutional neural networks is that the convolutional neural networks may only detect a few object classes for which the convolutional neural networks are trained for. For example, a trained convolutional neural network can detect stationary or walking persons. However, the convolutional neural network may not detect a person crawling. Training for additional classes requires a large amount of training data, which may also degrade performance on the primary object classes.

Accordingly, there is a need for an approach for small and specialized object detection.

One aspect provides a video surveillance system including a video camera configured to capture a video and an object detector in communication with the video camera and including an electronic processor. The electronic processor is configured to receive the video from the video camera and detect a plurality of candidate objects in the video using a convolutional neural network detection process and a background subtraction detection process. The electronic processor is also configured to identify a candidate object from the plurality of candidate objects. The candidate object detected by the background subtraction detection process in a location of the video with no candidate objects detected by the convolutional neural network detection process. The electronic processor is further configured to determine a background subtraction confidence level of the candidate object and categorize the candidate object as a detected object in the video in response to the background subtraction confidence level satisfying a background subtraction confidence threshold.

Another aspect provides an object detector including an electronic processor configured to detect a plurality of candidate objects in a video using a convolutional neural network detection process and a background subtraction detection process and identify a candidate object from the plurality of candidate objects. The candidate object detected by the background subtraction detection process in a location of the video with no candidate objects detected by the convolutional neural network detection process. The electronic processor is configured to determine a background subtraction confidence level of the candidate object and categorize the candidate object as a detected object in the video in response to the background subtraction confidence level satisfying a background subtraction confidence threshold.

Another aspect provides a method for object detection including detecting, using an electronic processor, a plurality of candidate objects in a video using a convolutional neural network detection process and a background subtraction detection process and identifying, using the electronic processor, a candidate object from the plurality of candidate objects. The candidate object detected by the background subtraction detection process in a location of the video with no candidate objects detected by the convolutional neural network detection process. The method also includes determining, using the electronic processor, a background subtraction confidence level of the candidate object and categorizing, using the electronic processor, the candidate object as a detected object in the video in response to the background subtraction confidence level satisfying a background subtraction confidence threshold.

Figure 1:
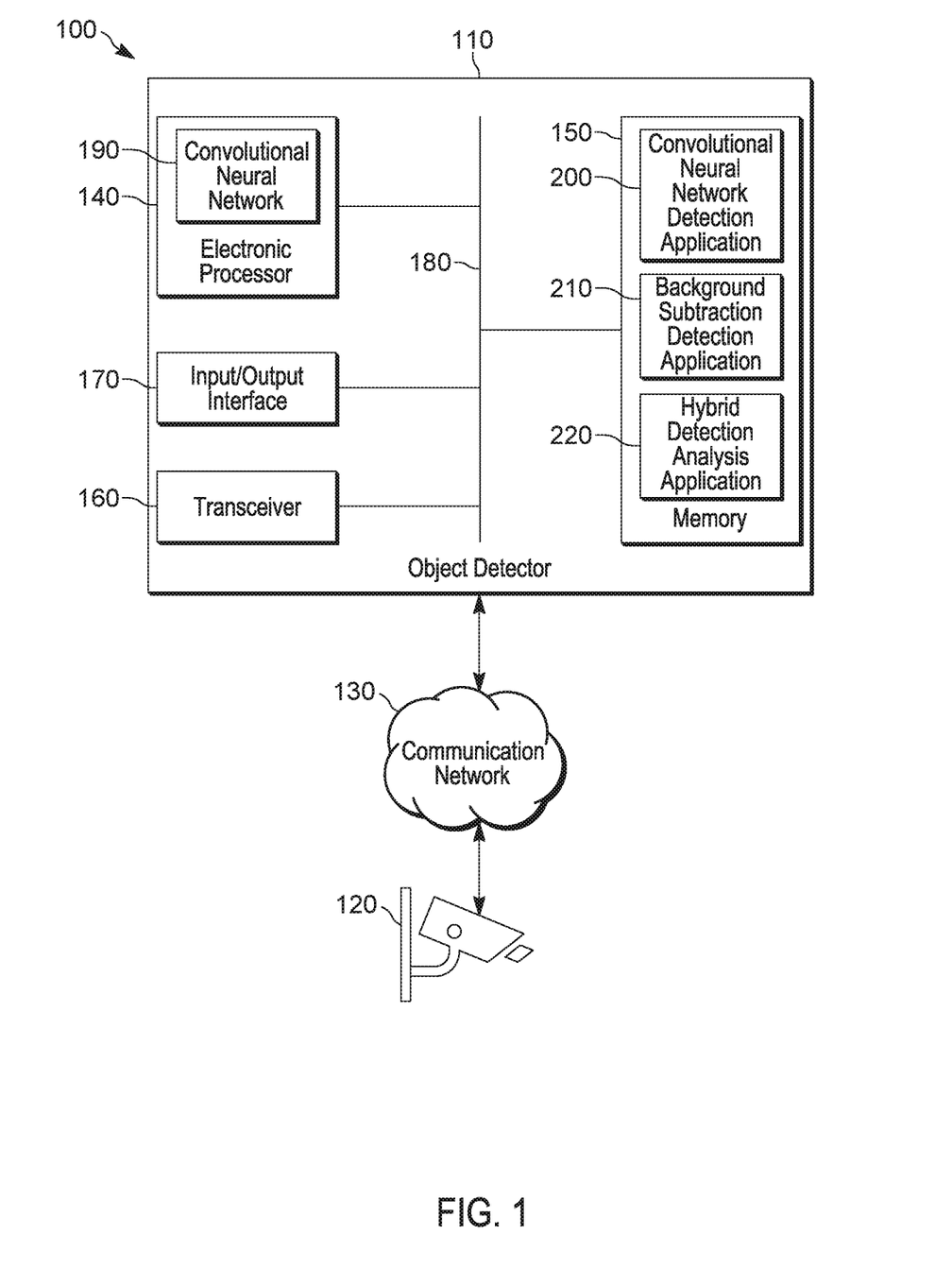
FIG. 1 is a block diagram of a video surveillance system in accordance with some aspects.

FIG. 1 is a block diagram of an example video surveillance system 100. In the example illustrated, the video surveillance system 100 includes an object detection computer, which in one example is an object detector 110, communicating with a video camera 120 over a communication network 130. FIG. 1 illustrates a single video camera 120 as an example. However, the video surveillance system 100 may include a plurality of video cameras 120 communicating with one or more object detectors 110. In some instances, the object detector 110 and the video camera 120 are part of the same device, for example, a surveillance camera. In these instances, the communication network 130 may not be needed or may include a wired connection for providing the captured video from the video camera 120 to the object detector 110. In other instances, the object detector 110 and the video camera 120 are separate devices, for example, a surveillance computer communicating with a surveillance camera. In these instances, the communication network 130 is a wired or wireless communication network including, for example, a cellular network, the Internet, a local area network, a wide area network, a private network, and the like. In yet other instances, the object detector 110 may not communicate with the video camera 120 and may analyze pre-recorded video stored in a memory. The object detector 110 could be an object detection server, an object detection engine, an object detection module, an object detection device, or the like.

In the example illustrated, the object detector 110 includes an electronic processor 140, a memory 150, a transceiver 160, and an input/output interface 170. The electronic processor 140, the memory 150, the transceiver 160, and the input/output interface 170 communicate over one or more control and/or data buses (for example, a communication bus 180). FIG. 1 illustrates only one example of the video surveillance system 100. The video surveillance system 100 may include more or fewer components and may perform additional functions other than those described herein.

In some instances, the electronic processor 140 is implemented as a microprocessor with separate memory, such as the memory 150. In other instances, the electronic processor 140 may be implemented as a microcontroller (with memory 150 on the same chip). In other instances, the electronic processor 140 may be implemented using multiple processors. In some instances, the object detector 110 may include one electronic processor 140 and/or a plurality of electronic processor 140, for example, in a cluster arrangement, one or more of which may be executing none, all or a portion of the applications of the object detector 110 described below, sequentially or in parallel across the one or more electronic processors 140. The one or more electronic processors 140 comprising the object detector 110 may be geographically co-located or may be geographically separated and interconnected via electrical and/or optical interconnects. One or more proxy servers or load balancing servers may control which one or more electronic processors 140 perform any part or all of the applications described below.

In the example illustrated, the memory 150 includes non-transitory, computer-readable memory that stores instructions that are received and executed by the electronic processor 140 to carry out the functionality of the object detector 110 described herein. The memory 150 may include, for example, a program storage area and a data storage area. The program storage area and the data storage area may include combinations of different types of memory, such as read-only memory and random-access memory.

The transceiver 160 enables wired and/or wireless communication between the object detector 110 and other devices (for example, the video camera 120). In some examples, the transceiver 160 may comprise separate transmitting and receiving components. The input/output interface 170 includes one or more input mechanisms (for example, a keyboard, a mouse, and the like), one or more output mechanisms (for example, a display, a speaker, and the like), and/or a combination input/output mechanism (for example, a touch-screen display).

In some examples, the electronic processor 140 includes a convolutional neural network 190 that loosely mimics neurons of an animal brain. In the example illustrated, the convolutional neural network 190 is a convolutional neural network that is specifically designed for analyzing visual imagery. In the example illustrated, the memory 150 includes a convolutional neural network detection application 200, a background subtraction detection application 210, and a hybrid detection analysis application 220.

The convolutional neural network detection application 200 includes a prediction model that may be trained prior to being deployed for object detection. Training data for training the prediction model includes image and/or video files. The image and/or video files may be pre-marked with locations including the class of objects to be detected by the convolutional neural network detection application 200. The prediction model generates a prediction based on an analysis of the image and/or video file provided as an input. The prediction includes one or more locations in the image and/or video where the prediction model has detected an object. A trainer may then award a score to the prediction model based on the accuracy of the prediction. The prediction model is implemented by the convolutional neural network 190 and is updated based on the scores. The prediction model may be trained using techniques other than those described herein. When the convolutional neural network detection application 200 is deployed after training the prediction model, the convolutional neural network detection application 200 outputs the locations and/or classes of detected objects and a confidence level for each detected object. The confidence level is a number (for example, a decimal or percentage) that indicates how confident the convolutional neural network detection application 200 is that an object is present at the marked location. The object detection performed by the convolutional neural network detection application 200 is referred to as the convolutional neural network detection process.

The background subtraction detection application 210 detects objects in a different way than the convolutional neural network detection application 200. The background subtraction detection application 210 receives video files as inputs and monitors the pixels between subsequent frames of the video file. The background subtraction detection application 210 segments the video into a background and a foreground. The background may include stationary features of the video and the foreground may include non-stationary (or moving) features of the video. In one example, the background subtraction detection application 210 detects the pixels that have a change in color or color temperature or intensity. The background subtraction detection application 210 detects these changed pixels, which is also known as foreground detection, and uses the location of the changed pixels to detect objects in the video file. Several different techniques of performing background subtraction are provided by Zhou et al. ("Moving Object Detection by Detecting Contiguous Outliers in the Low-Rank Representation," in IEEE Transactions on Pattern Analysis and Machine Intelligence Vol. 35, No. 3, pp. 597-610, March 2013—incorporated herein by reference), Zivkovic ("Improved Adaptive Gaussian Mixture Model for Background Subtraction," in Proceedings of the 17th international Conference on Pattern Recognition, 2004—incorporated herein by reference), Xin et al. ("Background Subtraction via Generalized Fused Lasso Foreground Modeling," in IEEE Conference on Computer Vision and Pattern Recognition, pp. 4676-4684, June 2015—incorporated herein by reference), Stauffer et al. ("Adaptive Background Mixture Models for Real-time Tracking," in 1999 IEEE Computer Society Conference on Computer Vision and Pattern Recognition, June 1999—incorporated herein by reference), and Zivkovic et al. "Efficient Adaptive Density Estimation per Image Pixel for the Task of Background Subtraction," in Pattern Recognition Letters, Vol. 27, Issue 7, pp. 773-780, 2006).

Similar to the convolutional neural network detection application 200, the background subtraction detection application 210 outputs the locations of detected objects and a confidence level for each detected object. The confidence level is a number (for example, a decimal or percentage) that indicates how confident the background subtraction detection application 210 is that an object is present at the marked location. The object detection performed by the background subtraction detection application 210 is referred to as the background subtraction detection process.

Figure 2:
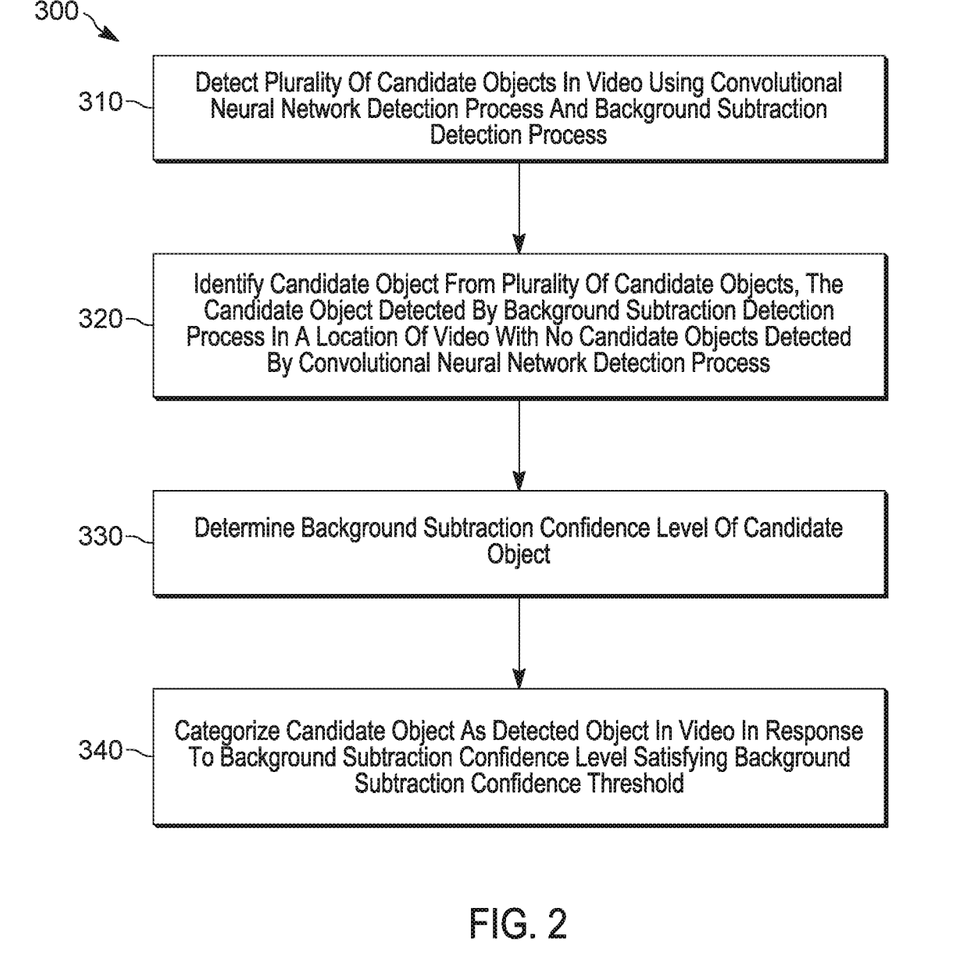
FIG. 2 is a flowchart of a method for object detection performed by the video surveillance system of FIG. 1 in accordance with some aspects.

The hybrid detection analysis application 220 uses a combination of the convolutional neural network detection application 200 and the background subtraction detection application 210 to improve detection accuracy of the object detector 110. FIG. 2 illustrates a flowchart of an example method 300 for object detection using the video surveillance system 100. For example, the electronic processor 140 executes the hybrid detection analysis application 220 to perform the method 300. In the example illustrated, the method 300 includes detecting, using the electronic processor 140, a plurality of candidate objects in video using a convolutional neural network detection process and a background subtraction detection process (at block 310). The object detector 110 receives the video from the video camera 120. The video camera 120 captures the video in a surveillance area and provides the video to the object detector 110 over the communication network 130. The electronic processor 140 executes the convolutional neural network detection application 200 to detect a first plurality of candidate objects and executes the background subtraction detection application 210 to detect a second plurality of candidate objects. Each of the first plurality of candidate objects and the second plurality of candidate objects has a corresponding confidence level provided by the convolutional neural network detection application 200 and the background subtraction detection application 210 respectively. The first plurality of candidate objects and the second plurality of candidate objects are combined to form the plurality of candidate objects.

The convolutional neural network detection application 200 analyzes the video captured by the video camera 120 and uses the prediction model to detect objects within the video. The prediction model provides an output including a list of candidate objects (that is, the first plurality of candidate objects) and a convolutional neural network confidence level of each of the candidate objects. The convolutional neural network confidence level may be a decimal or a percentage and provides an indication of how confident the prediction model is about the detection of the candidate object. The candidate objects are identified using the pixel locations of the candidate objects. The candidate objects are identified using the pixel locations of the candidate objects. The prediction model may output the X-axis and Y-axis coordinates of each pixel of a candidate object. In some examples, the prediction model outputs coordinates of a bounding box including the candidate object. The coordinates may include an X-axis coordinate and a Y-axis coordinate of the top left corner of the bounding box along with a height and width of the bounding box.

The background subtraction detection application 210 analyzes the video captured by the video camera 120 and detects object within the video. The background subtraction detection application 210 identifies candidate objects across multiple frames of the video by subtracting the pixels belonging to or designated as the background in each frame. The background subtraction detection application 210 provides an output including a list of candidate objects (that is, the second plurality of candidate objects) and a background subtraction confidence level of each of the candidate objects. The background subtraction confidence level may be a decimal or a percentage and provides an indication of how confident the background subtraction detection application 210 is about the detection of the candidate object. The candidate objects are identified using the pixel locations of the candidate objects. The prediction model may output the X-axis and Y-axis coordinates of each pixel of a candidate object. For example, in a standard definition video having a frame size of 640 (columns)×480 (rows) pixels, the location of an object may be identified by providing the row and column numbers of pixels constituting the object.

As discussed above, convolutional neural network based object detection performs well when the objects are sufficiently large pixel-wise and also for certain classes of objects. However, performance of the convolutional neural network may not be suitable for detecting small objects or specialized classes of objects (for example, a crawling person, a forklift, an airplane, or the like). For these categories of objects, convolutional neural network based object detection may return results with low confidence (that is, below a detection threshold) or may not detect the object at all. The method 300 uses a hybrid analysis of captured video using both the convolutional neural network based object detection and background subtraction based object detection to make up for the low confidence or non-detection of objects by the convolutional neural network based object detection.

In one example, the method 300 includes identifying, using the electronic processor 140, a candidate object from the plurality of candidate objects, the candidate object detected by the background subtraction detection process in a location of the video with no candidate objects detected by the convolutional neural network detection process (at block 320). The electronic processor 140 determines which of the second plurality of candidate objects are not detected by the convolutional neural network detection process. The electronic processor 140 compares the location of each of the second plurality of candidate objects with the location of each of the first plurality of candidate objects. When a location of one of the second plurality of candidate objects matches a location of one of the first plurality of candidate objects, then the corresponding object was detected by both the convolutional neural network detection process and the background subtraction detection process. When a location of one of the second plurality of candidate objects does not match a location of any of the first plurality of candidate objects, then the corresponding one of second plurality of candidate objects is not detected by the convolutional neural network detection process. The location may be a pixel location in the video. The electronic processor 140 may determine that a location of one of the second plurality of candidate objects matches a location of one of the first plurality of candidate objects based on, for example, an intersect over union (IoU) comparison performed between the one of the second plurality of candidate objects and the one of the first plurality of candidate objects. For example, the electronic processor 140 may determine a match when the IoU metric from the IoU comparison exceeds a match threshold (for example, 0.5).

In one example, the method 300 includes determining, using the electronic processor 140, a background subtraction confidence level of the candidate object (at block 330). The candidate object is not detected by the convolutional neural network detection process. As discussed above, the background subtraction detection application 210 returns a list of candidate objects and a background subtraction confidence level for each of the candidate objects. The electronic processor 140 retrieves the background subtraction confidence level of the candidate object not detected by the convolutional neural network detection process.

In one example, the method 300 includes categorizing, using the electronic processor 140, the candidate object as a detected object in the video in response to the background subtraction confidence level satisfying a background subtraction confidence threshold (at block 340). The electronic processor 140 compares the background subtraction confidence level of the candidate object to the background subtraction confidence threshold. The background subtraction confidence threshold may be selected based on the requirements of the video surveillance system 100 and may include a decimal or a percentage. When the background subtraction confidence level of the candidate object satisfies the background subtraction confidence threshold, the electronic processor 140 marks the candidate object as a detected object. Determining that a background subtraction confidence level satisfies the background subtraction confidence threshold may include determining that the background subtraction confidence level is greater than or equal to the background subtraction confidence threshold.

In some aspects, the electronic processor 140 provides an indication around a detected object. The video may be displayed on a display (for example, on the input/output interface 170) of the object detector 110 or another connected device. The indication is provided around the pixel location of the detected object. For example, the electronic processor 140 may identify two pixels of the detected object having the largest distance between them and draw a circle with the two pixels as endpoints of a diameter of the circle. Alternatively, the electronic processor 140 may identify two pixels having the largest horizontal distance and two pixels having the largest vertical distance between them and draw a rectangle including the largest horizontal distance and the largest vertical distance as the length of the sides of the rectangle around the pixel location of the detected object. In other aspects, the electronic processor 140 may generate visual alerts, audible alerts, tactile alerts, or the like in response to detecting an object or in response to detecting an object at a particular location of the surveillance area.

Figure 3:
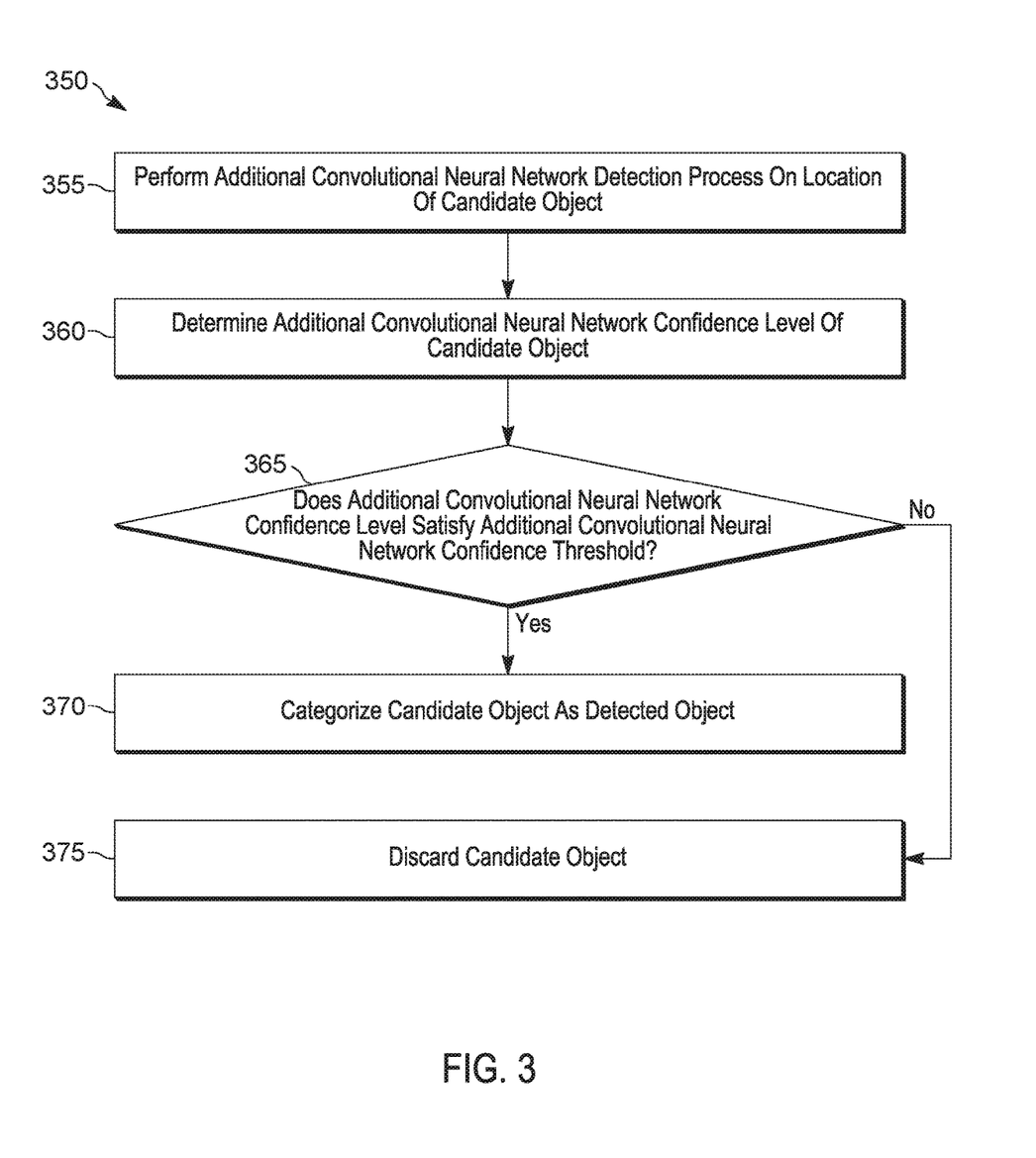
FIG. 3 is a flowchart of a method for object detection performed by the video surveillance system of FIG. 1 in accordance with some aspects.

FIG. 3 illustrates a flowchart of an example method 350 for object detection using the video surveillance system 100. For example, the electronic processor 140 executes the hybrid detection analysis application 220 to perform the method 350. The method 350 may be executed in response to the background subtraction confidence level determined at block 330 of method 300 not satisfying the background subtraction confidence level. At this stage, a candidate object is detected with a certain non-zero background subtraction confidence level by the background subtraction detection process. However, no such candidate was detected in the overlapping location by the convolutional neural network detection process. In these instances, performing an additional convolutional neural network detection process on the location of the candidate object detected only by the background subtraction confidence level is helpful in detecting any missed objects. For performing a convolutional neural network detection process, a full frame of the video is downsampled, which may make a small target object even smaller and harder to detect by the convolutional neural network detection process. Accuracy and reliability of the convolutional neural network detection process is higher when detecting over smaller portions of a video. A convolutional neural network detection process trained for detecting small objects may have many focal points in a full frame of video. A higher quality convolutional neural network detection process may be too slow to run on a full frame of video every time. Additionally, a convolutional neural network detection process specially trained for additional classes can be too slow or error prone for a full frame of video. Accordingly, performing an additional convolutional neural network detection process on a smaller location in which the background subtraction detection process detected a candidate object increases the accuracy and reliability of the object detection process. The method 350 allows for performing an additional convolutional neural network detection process to increase the accuracy and reliability of the object detection process.

In some aspects, performing the additional convolutional neural network detection process includes performing the convolutional neural network detection process as explained with respect to method 300 over a smaller area of the vide. In other aspects, the additional convolutional neural network detection process is different from the convolutional neural network detection process performed in method 300 and may include a specially designed convolutional neural network detection process for small or rare object targets. In some aspects, the method 350 may also be executed for every candidate object detected by the background subtraction detection process but not by the convolutional neural network detection process regardless of the background subtraction confidence level satisfying the background subtraction confidence threshold. In other aspects, the method 350 may not be executed when a candidate object is detected by the background subtraction detection process across multiple frames with a background subtraction confidence level higher than the background subtraction confidence threshold. In these aspects, the method 350 is executed when the candidate object is not detected across multiple frames even if the background subtraction confidence level is higher than the background subtraction confidence threshold.

In the example illustrated, the method 350 includes performing, using the electronic processor 140, an additional convolutional neural network detection process on a location of the candidate object (at block 355). The electronic processor 140 may provide a cropped portion or re-rendered portion of the location of the video including the candidate object as input to the convolutional neural network detection application 200 to perform the additional convolutional neural network detection process. In some aspects, the electronic processor 140 compares the background subtraction confidence level to a second background confidence threshold lower than the background subtraction confidence level. In these aspects, the electronic processor 140 performs the additional convolutional neural network detection process only in response to the background subtraction confidence level satisfying the second background subtraction confidence threshold. The method 350 also includes determining, using the electronic processor 140, an additional convolutional neural network confidence level of the candidate object (at block 360). The convolutional neural network detection application 200 may detect the candidate object and provide an additional convolutional neural network confidence level of the candidate object. The electronic processor 140 determines the additional convolutional neural network confidence level of the candidate object based on the additional convolutional neural network detection process on the location of the candidate object.

The method 350 includes determining, using the electronic processor 140, whether the additional convolutional neural network confidence level satisfies an additional convolutional neural network confidence threshold (at block 365). The electronic processor 140 compares the additional convolutional neural network confidence level of the candidate object to the additional convolutional neural network confidence threshold. The additional convolutional neural network confidence threshold may be selected based on the requirements of the video surveillance system 100 and may include a decimal or a percentage. The method 350 includes categorizing, using the electronic processor 140, the candidate object as the desired object in the video in response to the additional convolutional neural network confidence level satisfying an additional convolutional neural network confidence threshold (at block 370). Determining that an additional convolutional neural network confidence level satisfies the additional convolutional neural network confidence threshold may include determining that the additional convolutional neural network confidence level is greater than or equal to the additional convolutional neural network confidence threshold. The method 350 includes discarding, using the electronic processor 140, the candidate object in response to the additional convolutional neural network confidence level not satisfying the additional convolutional neural network confidence threshold (at block 375). Discarding the candidate object includes, for example, ignoring the candidate object or not providing an indication around the candidate object on the display.

Various instances of the methods 300 and/or 350 can therefore detect objects that are missed by a convolutional neural network detection process alone. Instances of the methods 300 and/or 350 are helpful in detecting specialized objects that are normally undetectable by the convolutional neural network detection process. For example, the methods 300 and/or 350 are helpful in detecting a crawling person.

Figure 4:
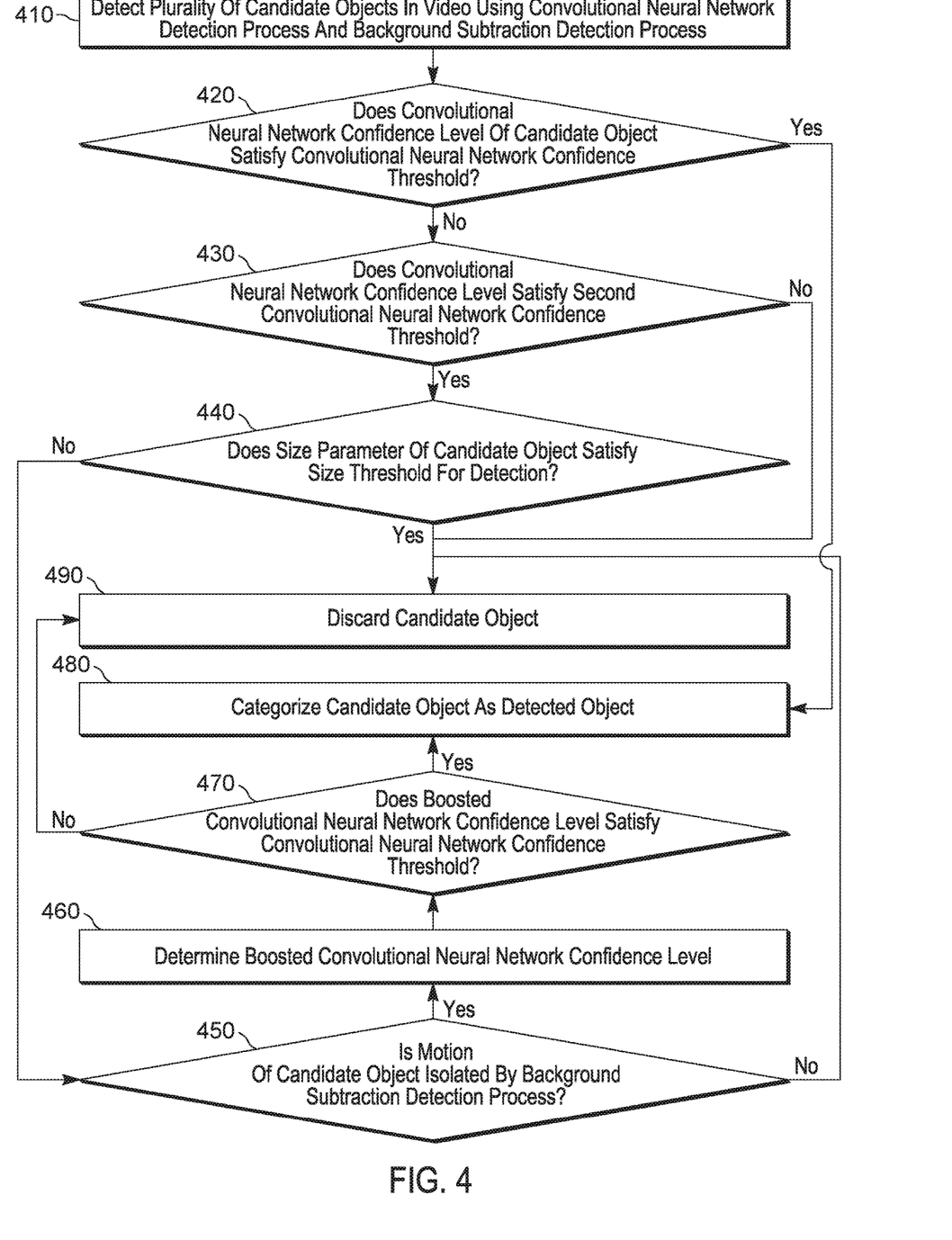
FIG. 4 is a flowchart of a method for boosted object detection performed by the video surveillance system of FIG. 1 in accordance with some aspects.

In some instances, when a candidate object is too small to be detected with sufficient confidence (for example, convolutional neural network confidence threshold) or the video has poor lighting for the candidate object to be detected with sufficient confidence by the convolutional neural network, a boosted object detection may be performed to increase the confidence level of detected objects. FIG. 4 is a flowchart of an example method 400 for boosted object detection. For example, the electronic processor 140 executes the hybrid detection analysis application 220 to perform the method 400. In the example illustrated, the method 400 includes detecting, using the electronic processor 140, a plurality of candidate objects in video using a convolutional neural network detection process and a background subtraction detection process (at block 410). The electronic processor 140 executes the convolutional neural network detection application 200 to detect a first plurality of candidate objects and executes the background subtraction detection application 210 to detect a second plurality of candidate objects. The first plurality of candidate objects and the second plurality of candidate objects are combined to form the plurality of candidate objects.

Instances of method 400 may also include determining, using the electronic processor 140, whether a convolutional neural network confidence level of a candidate object (for example, a second candidate object) satisfies a convolutional neural network confidence threshold (at block 420). The candidate object is detected by the convolutional neural network detection process. As discussed above, the convolutional neural network detection application 200 returns a list of candidate objects and a convolutional neural network confidence level for each of the candidate objects. The electronic processor 140 retrieves the convolutional neural network confidence level for each of the candidate objects and determines whether the convolutional neural network confidence level satisfies the convolutional neural network confidence threshold. The convolutional neural network confidence threshold may be selected based on the requirements of the video surveillance system 100 and may include a decimal or a percentage. Determining whether a convolutional neural network confidence level satisfies the convolutional neural network confidence threshold may include determining whether the convolutional neural network confidence level is greater than or equal to the convolutional neural network confidence threshold.

In response to the convolutional neural network confidence level of the candidate object not satisfying the convolutional neural network confidence threshold, the method 400 includes determining, using the electronic processor 140, whether the convolutional neural network confidence level of the candidate object satisfies a second convolutional neural network confidence threshold lower than the convolutional neural network confidence threshold (at block 430). The second convolutional neural network confidence threshold is selected to be below the convolutional neural network confidence threshold such that the second convolutional neural network confidence threshold is more easily satisfied by the convolutional neural network detection process than the convolutional neural network confidence threshold. The second convolutional neural network confidence threshold is selected based on the requirements of the video surveillance system 100 and includes a minimum threshold that is to be met for boosted detection.

In response to the convolutional neural network confidence level of the candidate object satisfying the second neural network confidence threshold, the method 400 includes determining, using the electronic processor 140, whether a size parameter of the candidate object satisfies a size threshold for detection (at block 440). In a preferred aspect, the size threshold for detection is a maximum size for detection such that the size parameter satisfies the threshold when the size parameter is equal and/or greater than the maximum size. The size parameter of a candidate object includes, for example, a height, a width, and the like of the candidate object in the video. The height and width may be determined by counting the number of pixels between the farther endpoints in the vertical and horizontal direction. The size threshold is selected based on the requirements of the video surveillance system 100. The size threshold can be selected as 5% of the frame height of the video. For example, in a standard definition video having a frame size of 640×480 pixels, the size threshold can be set as a height of 24 pixels.

In response to the size parameter of the candidate object not satisfying the size threshold, the method 400 includes determining, using the electronic processor 140, whether a motion of the candidate object is isolated by the background subtraction detection process (at block 450). The background subtraction detection application 210 detects candidate objects by detecting motion of the candidate objects across frames of the video. Specifically, the background subtraction detection application 210 isolates the motion, also known as foreground detection, and subtracts the background from the frames to detect an object. The electronic processor 140 may determine whether the motion of the candidate object is isolated by determining whether a second candidate object was also detected by the background subtraction detection application 210 at a location coinciding with the location of the candidate object detected by the convolutional neural network detection application 200 and having similar size (for example, within a size and location tolerance). Since the second candidate object and the candidate object coincide at least partly in location, the second candidate object may be the same as the candidate object In response to the motion of the candidate object being isolated by the background subtraction detection process, the method 400 includes determining, using the electronic processor 140, a boosted convolutional neural network confidence level of the candidate object based on the convolutional neural network confidence level and an overlap ratio of a first location (for example, a second location) of the candidate object detected by the convolutional neural network detection process and a second location (for example, a third location) of the candidate object detected by the background separation detection process (at block 460). The boosted convolutional neural network may be determined based on the convolutional neural network confidence level, a size of the candidate object, a motion of the candidate object, and isolation of the candidate object. In one example, the boosted convolutional neural network confidence level is calculated by multiplying the convolutional neural network confidence level with the overlap ratio and multiplying the resulting product with a constant value (that is, Boosted Convolutional Neural Network Confidence Level=Constant*Overlap Ratio*Convolutional Neural Network Confidence Level). In another example, the convolutional neural network confidence level is subtracted from the decimal 1 and the result is multiplied by the overlap ratio. The resulting product is then added to the convolutional neural network confidence level to determine the boosted convolutional neural network confidence level (that is, Boosted Convolutional Neural Network Confidence Level=Convolutional Neural Network Confidence Level+ Overlap Ratio*(1−Convolutional Neural Network Confidence Level). In these examples, the convolutional neural network confidence level, the overlap ratio, and the constant are decimal values.

Instances of the method 400 may also include determining, using the electronic processor 140, whether the boosted convolutional neural network confidence level satisfies the convolutional neural network confidence threshold (at block 470). The electronic processor 140 compares the boosted convolutional neural network confidence level to the convolutional neural network confidence threshold. The boosted convolutional neural network confidence level satisfies the convolutional neural network confidence threshold, for example, when the boosted convolutional neural network confidence level is equal to or greater than the convolutional neural network confidence threshold.

In response to the convolutional neural network confidence level of the candidate object satisfying the convolutional neural network confidence threshold or in response to the boosted convolutional neural network confidence level of the candidate object satisfying the convolutional neural network confidence threshold, the method 400 includes categorizing, using the electronic processor 140, the candidate object as a detected object (that is, a second detected object) (at block 480). When the convolutional neural network confidence level of the candidate object or the boosted convolutional neural network confidence level satisfies the convolutional neural network confidence threshold, the electronic processor 140 marks the candidate object as a detected object.

In response to the convolutional neural network confidence level of the candidate object not satisfying the second convolutional neural network confidence threshold, or in response to the size parameter of the candidate object satisfying the size threshold, or in response to the motion of the candidate object not being isolated by the background subtraction detection process, or in response to the boosted convolutional neural network confidence level not satisfying the convolutional neural network confidence threshold, the method 400 includes discarding, using the electronic processor 140, the candidate object (at block 490). Discarding the candidate object includes, for example, ignoring the candidate object or not providing an indication around the candidate object on the display.

Figure 5A:
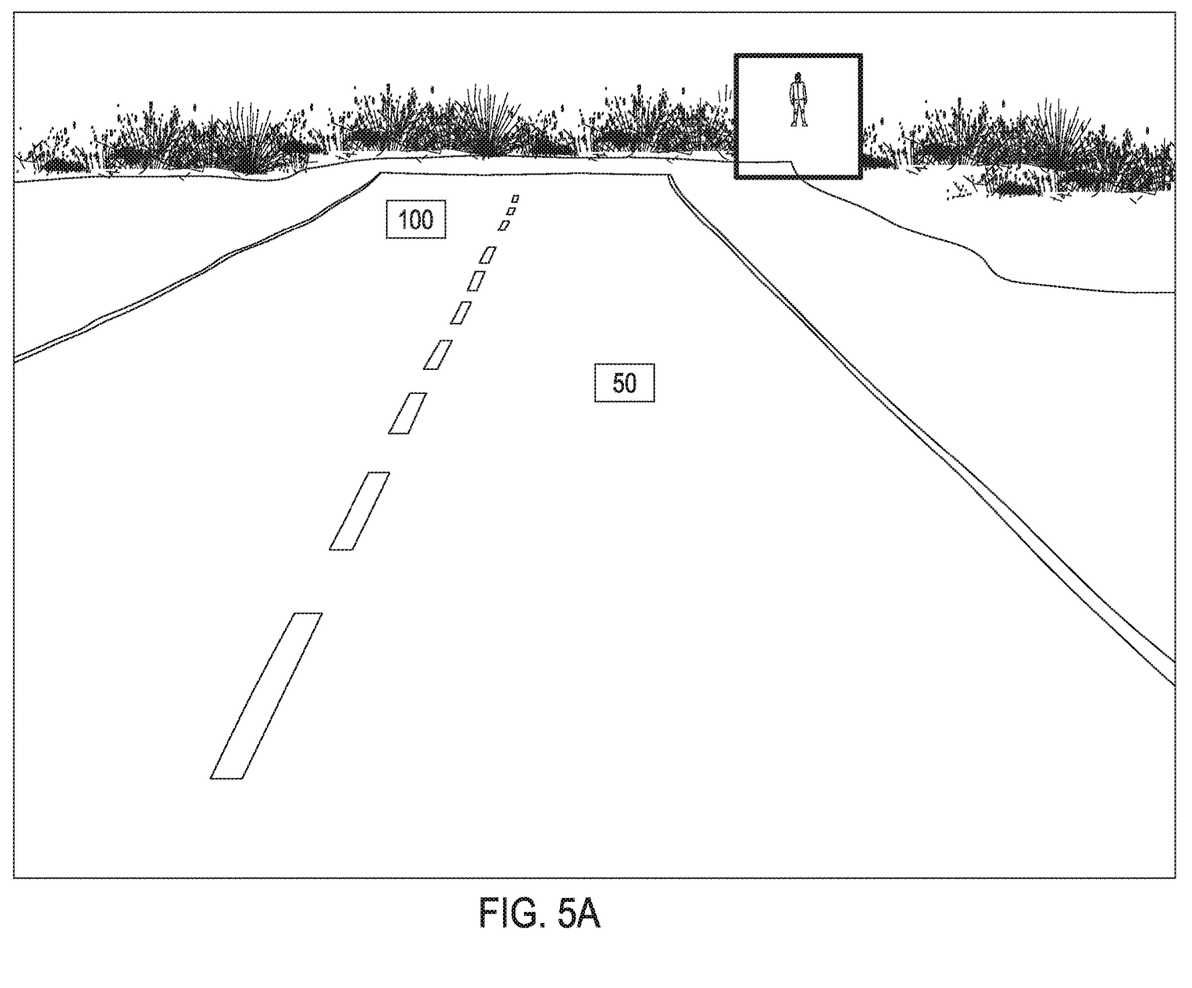
FIG. 5A is an example of object detection performed by the methods of FIGS. 2-4 in accordance with some aspects.
Figure 5B:
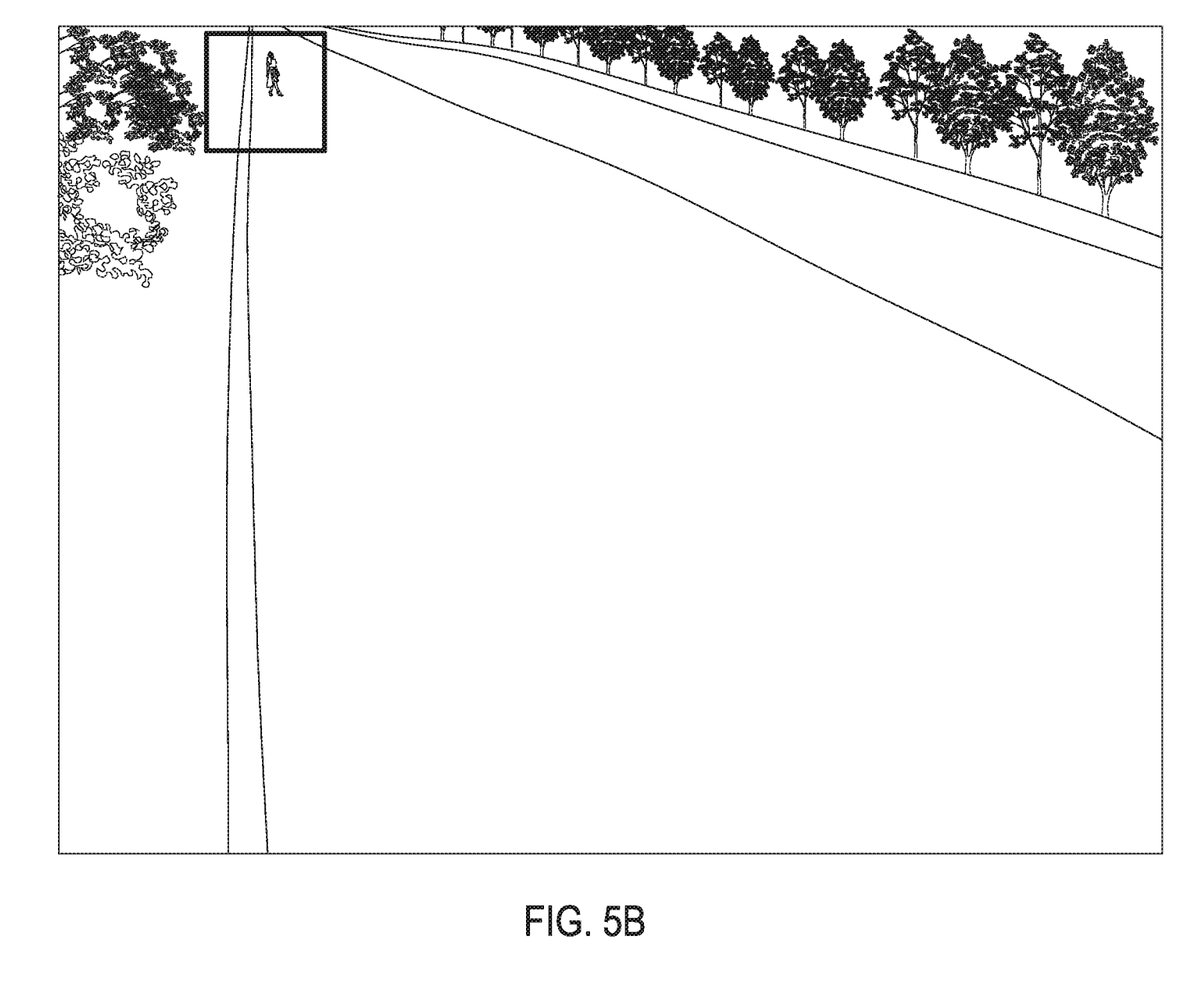
FIG. 5B is an example of object detection performed by the methods of FIGS. 2-4 in accordance with some aspects.
Figure 6:
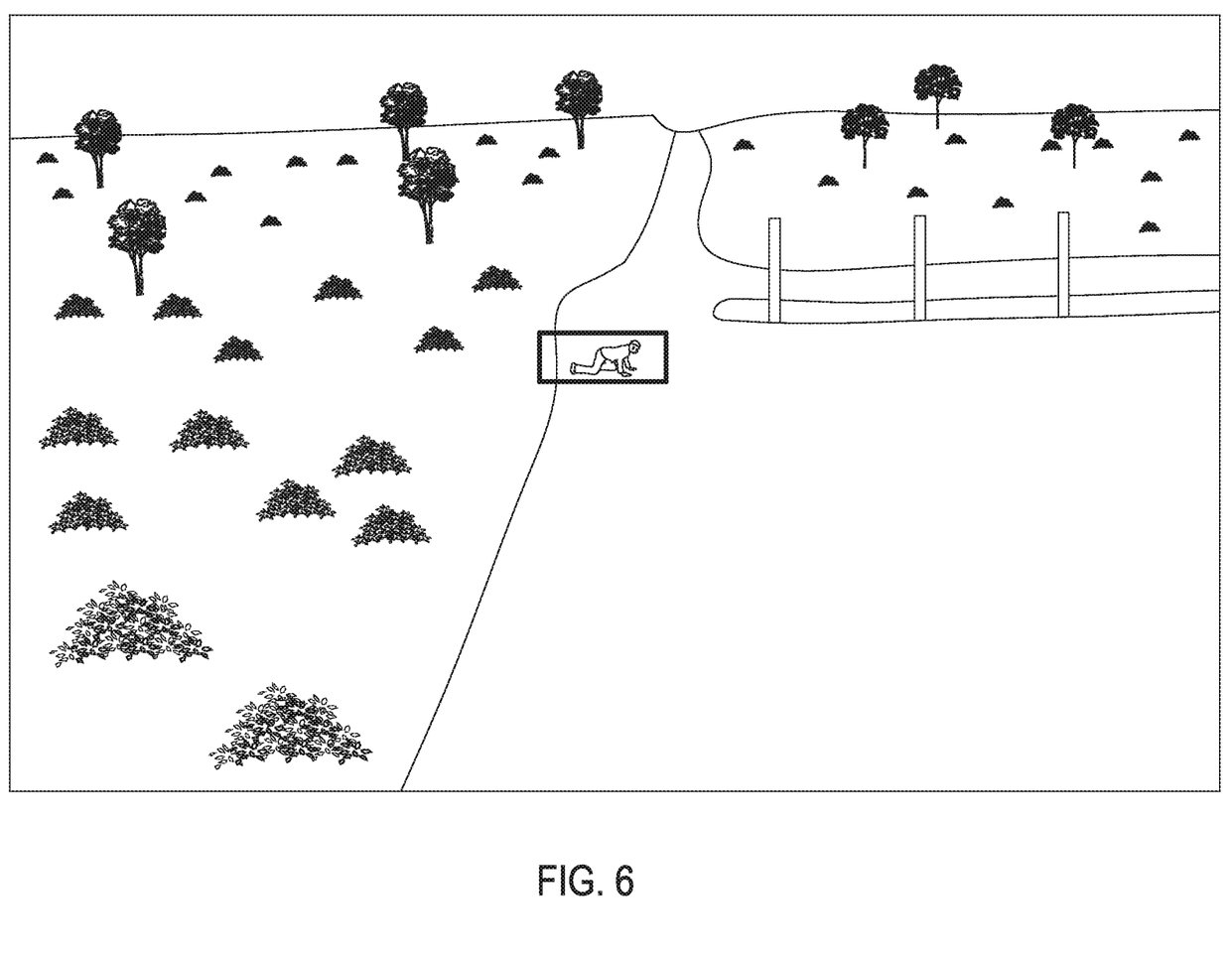
FIG. 6 is an example of object detection performed by the methods of FIGS. 2-4 in accordance with some aspects.

The methods 300, 350, and 400 can therefore be used, among other things, to detect small and specialized objects that are not normally detected by convolutional neural network detection process alone. For example, as shown in FIGS. 5A and 5B, the person may be too small for the convolutional neural network detection process to detect. One or both of the methods 300 and 400 can be used to detect the person based on movement of the person between frames of the video. Similarly, as shown in FIG. 6, the crawling person may be too specialized for the convolutional neural network detection process, which is trained for detecting vehicles, persons, and/or animals, to detect. One or all of the methods 300, 350, and 400 can be used to detect the crawling person based on movement of the crawling person between frames of the video. It should be noted that the methods 300, 350, and 400 may be independent applications that include separate applications than the hybrid detection analysis application 220. However, for the simplification of this disclosure, the methods 300, 350, and 400 are disclosed as being part of a single application.

In the foregoing specification, specific examples, features, and aspects have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A video surveillance system comprising:
   a video camera configured to capture a video; and
   an object detector in communication with the video camera and including an electronic processor configured to
      receive the video from the video camera,
      detect a plurality of candidate objects in the video using a convolutional neural network detection process and a background subtraction detection process;
      identify a candidate object from the plurality of candidate objects, the candidate object detected by the background subtraction detection process in a location of the video with no candidate objects detected by the convolutional neural network detection process;
      determine a background subtraction confidence level of the candidate object;
      categorize the candidate object as a detected object in the video in response to the background subtraction confidence level satisfying a background subtraction confidence threshold; and
      in response to the background subtraction confidence level not satisfying the background subtraction confidence threshold
         perform an additional convolutional neural network detection process on a location of the candidate object;
         determine an additional convolutional neural network confidence level of the candidate object; and
         categorize the candidate object as the detected object in the video in response to the additional convolutional neural network confidence level satisfying an additional convolutional neural network confidence threshold.

2. The video surveillance system of claim 1, wherein the electronic processor is further configured to discard the candidate object in response to the additional convolutional neural network confidence level not satisfying the additional convolutional neural network confidence threshold.

3. The video surveillance system of claim 1, wherein the electronic processor is further configured to
   determine whether a convolutional neural network confidence level of a second candidate object from the plurality of candidate objects satisfies a convolutional neural network confidence threshold, the second candidate object detected by the convolutional neural network detection process;
   categorize the second candidate object as a second detected object in the video in response to the convolutional neural network confidence level satisfying the convolutional neural network confidence threshold;
   in response to the convolutional neural network confidence level not satisfying the convolutional neural network confidence threshold
      determine whether the convolutional neural network confidence level satisfies a second convolutional neural network confidence threshold lower than the convolutional neural network confidence threshold, in response to the convolutional neural network confidence level satisfying the second convolutional neural network confidence threshold
    determine whether a size parameter of the second candidate object satisfies a size threshold for detection,
    in response to the size parameter not satisfying the size threshold for detection
        determine whether a motion of the second candidate object is isolated by the background subtraction detection process,
        in response to the motion of the second candidate object being isolated by the background subtraction detection process
            determine a boosted convolutional neural network confidence level of the second candidate object based on the convolutional neural network confidence level and an overlap ratio of a second location of the second candidate object detected by the convolutional neural network detection process and a third location of the second candidate object detected by the background subtraction detection process; and
    discard the second candidate object in response to the boosted convolutional neural network confidence level not satisfying the convolutional neural network confidence threshold.

4. The video surveillance system of claim 3, wherein the electronic processor further configured to
    in response to the boosted convolutional neural network confidence level satisfying the convolutional neural network confidence threshold
        categorize the second candidate object as the second detected object.

5. The video surveillance system of claim 1, wherein the background subtraction detection process includes foreground detection for detecting candidate objects.

6. The video surveillance system of claim 1, wherein the additional convolutional neural network detection process is different from the convolutional neural network detection process.

7. The video surveillance system of claim 1, wherein performing the additional convolutional neural network detection process on the location of the candidate object includes performing the additional convolutional neural network detection process on a cropped portion of the location of the video including the candidate object.

8. An object detector comprising:
    an electronic processor configured to
        detect a plurality of candidate objects in a video using a convolutional neural network detection process and a background subtraction detection process;
        identify a candidate object from the plurality of candidate objects, the candidate object detected by the background subtraction detection process in a location of the video with no candidate objects detected by the convolutional neural network detection process;
        determine a background subtraction confidence level of the candidate object; and
        categorize the candidate object as a detected object in the video in response to the background subtraction confidence level satisfying a background subtraction confidence threshold; and
        in response to the background subtraction detection level not satisfying the background subtraction confidence threshold
            perform an additional convolutional neural network detection process on a location of the candidate object;
            determine an additional convolutional neural network confidence level of the candidate object; and
            categorize the candidate object as the detected object in the video in response to the additional convolutional neural network confidence level satisfying an additional convolutional neural network confidence threshold.

9. The object detector of claim 8, wherein the electronic processor is further configured to discard the candidate object in response to the additional convolutional neural network confidence level not satisfying the additional convolutional neural network confidence threshold.

10. The object detector of claim 8, wherein the electronic processor is further configured to
    determine whether a convolutional neural network confidence level of a second candidate object from the plurality of candidate objects satisfies a convolutional neural network confidence threshold, the second candidate object detected by the convolutional neural network detection process;
    categorize the second candidate object as a second detected object in the video in response to the convolutional neural network confidence level satisfying the convolutional neural network confidence threshold;
    in response to the convolutional neural network confidence level not satisfying the convolutional neural network confidence threshold
        determine whether the convolutional neural network confidence level satisfies a second convolutional neural network confidence threshold lower than the convolutional neural network confidence threshold;
        in response to the convolutional neural network confidence level satisfying the second convolutional neural network confidence threshold
            determine whether a size parameter of the second candidate object satisfies a size threshold for detection,
            in response to the size parameter not satisfying the size threshold for detection
                determine whether a motion of the second candidate object is isolated by the background subtraction detection process,
                in response to the motion of the second candidate object being isolated by the background subtraction detection process
                      determine a boosted convolutional neural network confidence level of the second candidate object based on the convolutional neural network confidence level and an overlap ratio of a second location of the second candidate object detected by the convolutional neural network detection process and a third location of the second candidate object detected by the background subtraction detection process; and
    discard the second candidate object in response to the boosted convolutional neural network confidence level not satisfying the convolutional neural network confidence threshold.

11. The object detector of claim 10, wherein the electronic processor further configured to
    in response to the boosted convolutional neural network confidence level satisfying the convolutional neural network confidence threshold categorize the second candidate object as the second detected object in response to detecting movement of the second candidate object between multiple frames of the video.

12. The object detector of claim 8, wherein the background subtraction detection process includes foreground detection for detecting candidate objects.

13. The object detector of claim 8, wherein the additional convolutional neural network detection process is be different from the convolutional neural network detection process.

14. The object detector of claim 8, wherein performing the additional convolutional neural network detection process on a location of the candidate object includes performing the additional convolutional neural network detection process on a cropped portion of the location of the video including the candidate object.

15. A method for object detection comprising:
  detecting, using an electronic processor, a plurality of candidate objects in a video using a convolutional neural network detection process and a background subtraction detection process;
  identifying, using the electronic processor, a candidate object from the plurality of candidate objects, the candidate object detected by the background subtraction detection process in a location of the video with no candidate objects detected by the convolutional neural network detection process;
  determining, using the electronic processor, a background subtraction confidence level of the candidate object;
  categorizing, using the electronic processor, the candidate object as a detected object in the video in response to the background subtraction confidence level satisfying a background subtraction confidence threshold; and
  in response to the background subtraction detection level not satisfying the background subtraction confidence threshold
    performing an additional convolutional neural network detection process on a location of the candidate object;
    determining an additional convolutional neural network confidence level of the candidate object; and
    categorizing the candidate object as the detected object in the video in response to the additional convolutional neural network confidence level satisfying an additional convolutional neural network confidence threshold.

16. The method of claim 15, further comprising discarding the candidate object in response to the additional convolutional neural network confidence level not satisfying the additional convolutional neural network confidence threshold.

17. The method of claim 15, further comprising:
  determining whether a convolutional neural network confidence level of a second candidate object from the plurality of candidate objects satisfies a convolutional neural network confidence threshold, the second candidate object detected by the convolutional neural network detection process;
  categorizing the second candidate object as a second detected object in the video in response to the convolutional neural network confidence level satisfying the convolutional neural network confidence threshold;
  in response to the convolutional neural network confidence level not satisfying the convolutional neural network confidence threshold
    determining whether the convolutional neural network confidence level satisfies a second convolutional neural network confidence threshold lower than the convolutional neural network confidence threshold;
  in response to the convolutional neural network confidence level satisfying the second convolutional neural network confidence threshold
    determining whether a size parameter of the second candidate object satisfies a size threshold for detection;
  in response to the size parameter not satisfying the size threshold for detection
    determining whether a motion of the second candidate object is isolated by the background subtraction detection process;
  in response to the motion of the second candidate object being isolated by the background subtraction detection process
    determining a boosted convolutional neural network confidence level of the second candidate object based on the convolutional neural network confidence level and an overlap ratio of a second location of the second candidate object detected by the convolutional neural network detection process and a third location of the second candidate object detected by the background subtraction detection process; and
  discarding the second candidate object in response to the boosted convolutional neural network confidence level not satisfying the convolutional neural network confidence threshold.

18. The method of claim 17, further comprising:
  in response to the boosted convolutional neural network confidence level satisfying the convolutional neural network confidence threshold
    categorizing the second candidate object as the second detected object in response to detecting movement of the second candidate object between multiple frames of the video.

19. The method of claim 15, wherein the background subtraction detection process includes foreground detection for detecting candidate objects.

20. The method of claim 15, wherein the additional convolutional neural network detection process different from the convolutional neural network detection process.

* * * * *